(12) United States Patent
Abotabl et al.

(10) Patent No.: US 12,156,059 B2
(45) Date of Patent: Nov. 26, 2024

(54) DYNAMIC ADAPTATION OF PHYSICAL DOWNLINK CONTROL CHANNEL (PDCCH) MONITORING OCCASIONS LINKED BETWEEN MULTIPLE TRANSMIT AND RECEIVE POINTS (MTRPS)

(71) Applicant: QUALCOMM Incorporated, San Diego, CA (US)

(72) Inventors: Ahmed Attia Abotabl, San Diego, CA (US); Marwen Zorgui, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/891,995

(22) Filed: Aug. 19, 2022

(65) Prior Publication Data

US 2024/0064541 A1 Feb. 22, 2024

(51) Int. Cl.
*H04W 24/08* (2009.01)
*H04W 72/1273* (2023.01)
*H04W 76/19* (2018.01)
*H04W 76/20* (2018.01)

(52) U.S. Cl.
CPC ....... *H04W 24/08* (2013.01); *H04W 72/1273* (2013.01); *H04W 76/19* (2018.02); *H04W 76/20* (2018.02)

(58) Field of Classification Search
CPC . H04W 24/08; H04W 72/1273; H04W 76/19; H04W 76/20; H04W 72/23
See application file for complete search history.

(56) References Cited

U.S. PATENT DOCUMENTS

| | | | |
|---|---|---|---|
| 2023/0344570 A1* | 10/2023 | Jung | H04L 1/1671 |
| 2024/0089061 A1* | 3/2024 | Gao | H04L 5/0098 |
| 2024/0305429 A1* | 9/2024 | Ahmadian Tehrani | H04L 5/0023 |

* cited by examiner

*Primary Examiner* — Eric Myers
(74) *Attorney, Agent, or Firm* — Qualcomm Incorporated/Seyfarth Shaw LLP

(57) ABSTRACT

A method for wireless communication at a user equipment (UE), includes receiving, from any one transmit and receive point (TRP) of a group of TRPs, a first radio resource control (RRC) message configuring a linkage between a first physical downlink control channel (PDCCH) candidate associated with a first monitoring occasion in a first search space (SS) set associated with a first TRP of the group of TRPs and a second PDCCH candidate associated with a second monitoring occasion in a second SS set associated with a second TRP of the group of TRPs. The method also includes receiving, from any one TRP of the group of TRPs, a dynamic indication enabling or disabling the linkage. The method further includes monitoring the first monitoring occasion for first PDCCH candidate and selectively monitoring the second monitoring occasion for the second PDCCH candidate based on whether the linkage is enabled or disabled.

30 Claims, 11 Drawing Sheets

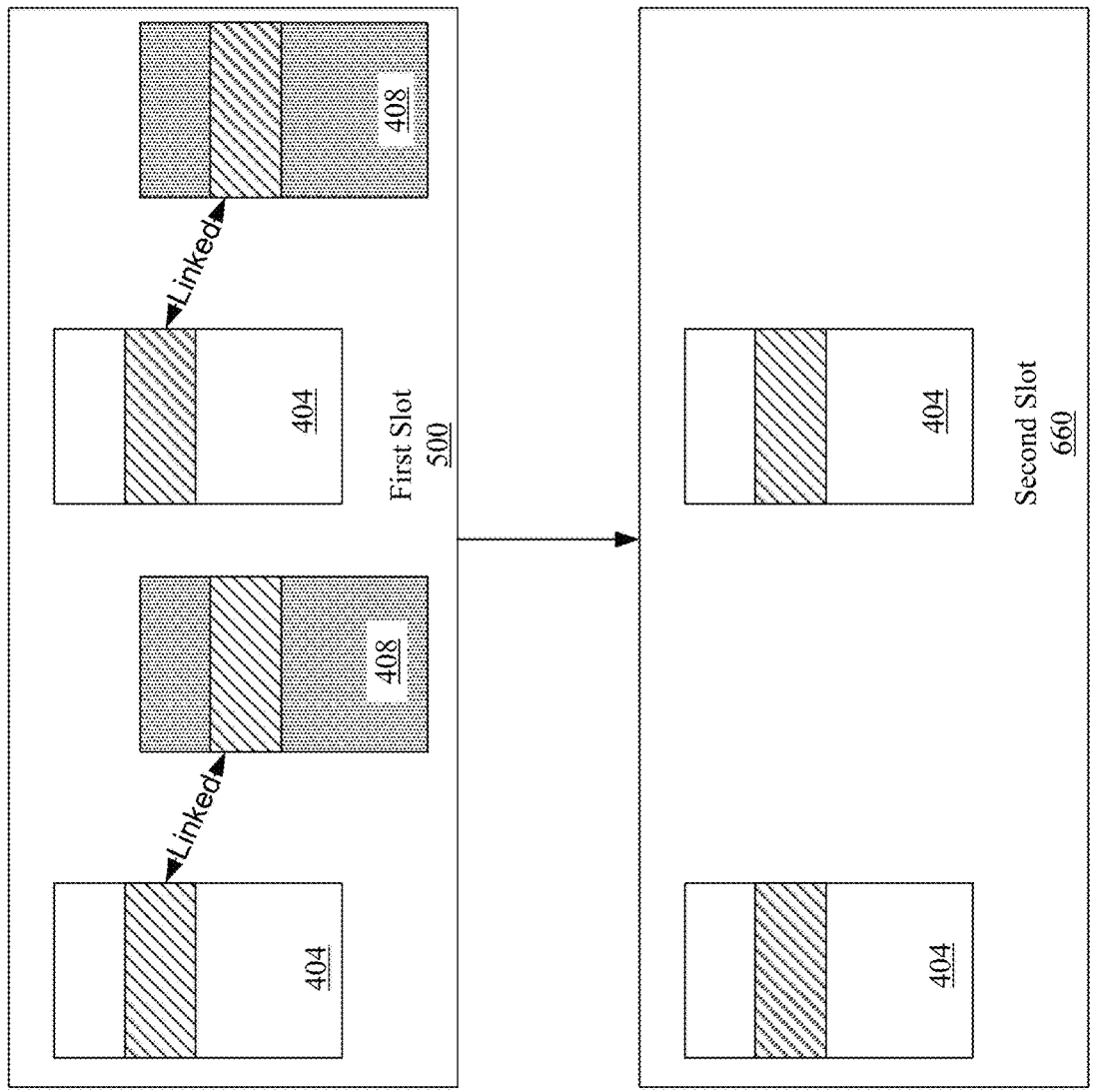

DYNAMIC ADAPTATION OF PHYSICAL DOWNLINK CONTROL CHANNEL (PDCCH) MONITORING OCCASIONS LINKED BETWEEN MULTIPLE TRANSMIT AND RECEIVE POINTS (MTRPS)

FIELD OF THE DISCLOSURE

The present disclosure relates generally to wireless communications, and more specifically to dynamically disabling or enabling a linkage of physical downlink control channel (PDCCH) monitoring occasions between multiple transmit and receive points (mTRPs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

A network node, such as a base station, may be powered by an external power source to provide continuous access to the wireless communication network. In some examples, power consumption of the network node may account for a majority of a total power consumption associated with the wireless communication network. In some conventional systems, to reduce the total power consumed by the wireless communication network, the wireless communication network may dynamically enable or disable one or more transmit and receive points (TRPs) in a multiple TRP (mTRP) system. In contrast to the network node, the UE may use a battery as a power source. Therefore, the UE may operate for a limited amount of time without an external power source. In some conventional systems, the UE may enter an idle state or an inactive state to improve battery life.

SUMMARY

In one aspect of the present disclosure, a method for wireless communication includes receiving, from any one transmit and receive point (TRP) of a group of TRPs, a first radio resource control (RRC) message configuring a linkage between a first physical downlink control channel (PDCCH) candidate associated with a first monitoring occasion in a first search space (SS) set associated with a first TRP of the group of TRPs and a second PDCCH candidate associated with a second monitoring occasion in a second SS set associated with a second TRP of the group of TRPs. The method further includes receiving, from any one TRP of the group of TRPs, a dynamic indication enabling or disabling the linkage. The method still further includes monitoring the first monitoring occasion for first PDCCH candidate. The method also includes selectively monitoring the second monitoring occasion for the second PDCCH candidate based at least in part on whether the linkage is enabled or disabled.

Another aspect of the present disclosure is directed to an apparatus including means for receiving, from any one TRP of a group of TRPs, an RRC message configuring a linkage between a first PDCCH candidate associated with a first monitoring occasion in a first SS set associated with a first TRP of the group of TRPs and a second PDCCH candidate associated with a second monitoring occasion in a second SS set associated with a second TRP of the group of TRPs. The apparatus further includes means for receiving, from any one TRP of the group of TRPs, a dynamic indication enabling or disabling the linkage. The apparatus still further includes means for monitoring the first monitoring occasion for first PDCCH candidate. The apparatus also includes means for selectively monitoring the second monitoring occasion for the second PDCCH candidate based at least in part on whether the linkage is enabled or disabled.

In another aspect of the present disclosure, a non-transitory computer-readable medium with non-transitory program code recorded thereon is disclosed. The program code is executed by a processor and includes program code to receive, from any one TRP of a group of TRPs, an RRC message configuring a linkage between a first PDCCH candidate associated with a first monitoring occasion in a first SS set associated with a first TRP of the group of TRPs and a second PDCCH candidate associated with a second monitoring occasion in a second SS set associated with a second TRP of the group of TRPs. The program code further includes program code to receive, from any one TRP of the group of TRPs, a dynamic indication enabling or disabling the linkage. The program code still further includes program code to monitor the first monitoring occasion for first PDCCH candidate. The program code also includes program code to selectively monitor the second monitoring occasion for the second PDCCH candidate based at least in part on whether the linkage is enabled or disabled.

Another aspect of the present disclosure is directed to an apparatus for wireless communications at a UE. The apparatus including a processor and a memory coupled with the processor and storing instructions operable, when executed by the processor, to cause the apparatus to receive, from any one TRP of a group of TRPs, an RRC message configuring a linkage between a first PDCCH candidate associated with a first monitoring occasion in a first SS set associated with a first TRP of the group of TRPs and a second PDCCH candidate associated with a second monitoring occasion in a second SS set associated with a second TRP of the group of TRPs. Execution of the instructions also cause the apparatus to receive, from any one TRP of the group of TRPs, a dynamic indication enabling or disabling the linkage. Execution of the instructions further cause the apparatus to monitor the first monitoring occasion for first PDCCH candidate. Execution of the instructions still further cause the apparatus to selectively monitor the second monitoring occasion for the second PDCCH candidate based at least in part on whether the linkage is enabled or disabled.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIGS. 6B and 6C are block diagrams illustrating examples of receiving monitoring occasions based on a new PDCCH configuration, in accordance with various aspects of the present disclosure.

DETAILED DESCRIPTION

Figure 1:
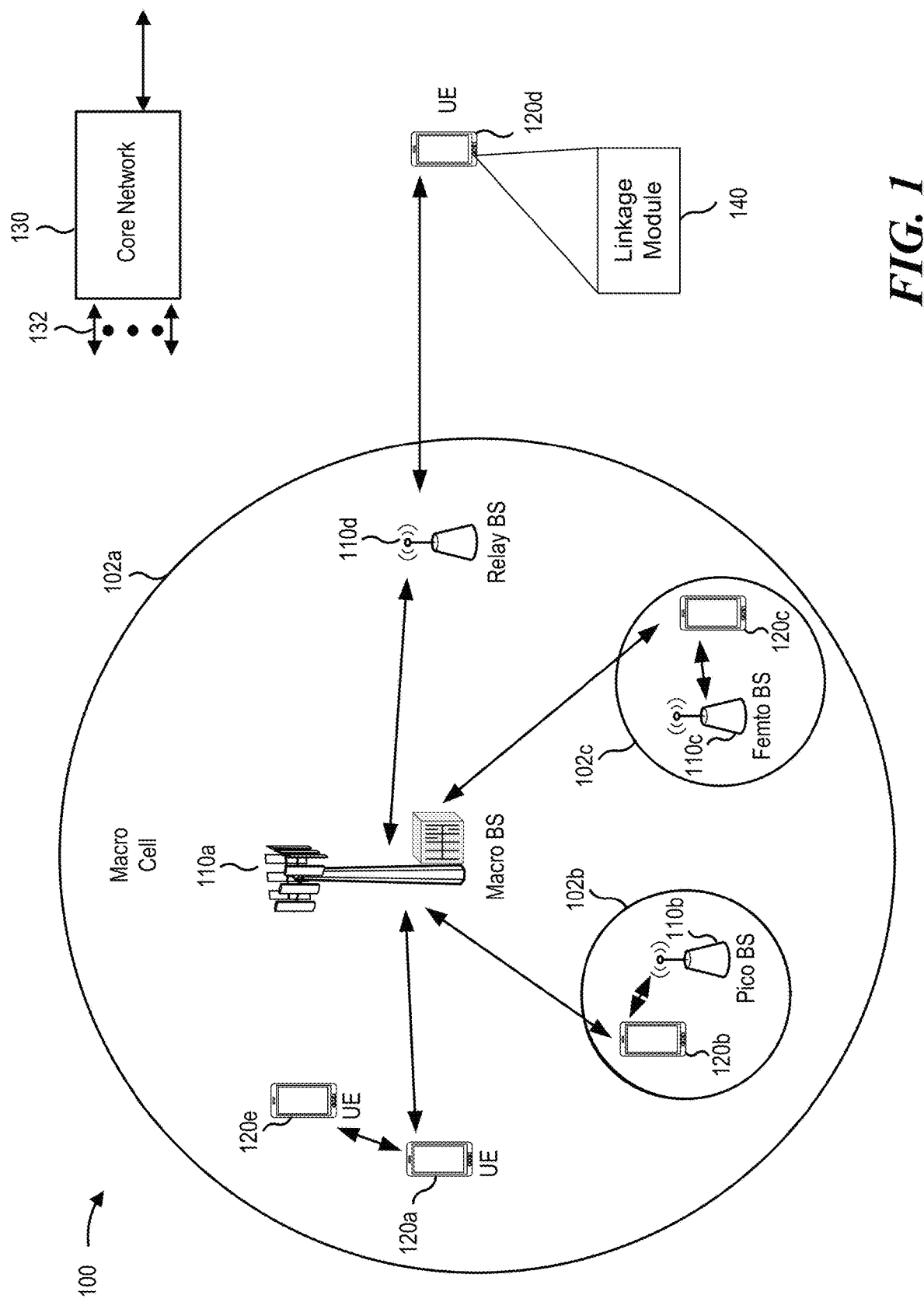
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As discussed, a network node, such as a base station, may be powered by an external power source to provide continuous access to the wireless communication network. In some examples, power consumption of the network node may account for a majority of a total power consumption associated with the wireless communication network. In some such examples, to reduce the total power consumed by the wireless communication network, the wireless communication network may dynamically enable or disable one or more transmit and receive points (TRPs) in a multiple TRP (mTRP) system. Dynamically enabling or disabling one or more TRPs may increase network latency due to a transition time associated with enabling or disabling a TRP.

In some mTRP systems, two physical downlink control channel (PDCCH) candidate monitoring occasions may be linked between two search space (SS) sets. Each SS set may be associated with a different control and resource set (CORESET), and each CORESET may be associated with a different transmission configuration indicator (TCI) state. Furthermore, each CORESET may be associated with a single TRP of the mTRP system. In some examples, transmission of the linked PDCCH candidates may be repeated within a slot. Linking SS sets and corresponding PDCCH candidate monitoring occasions between mTRPs may increase energy consumption of the wireless communication network and a user equipment (UE). The linking may also increase UE complexity.

Various aspects of the present disclosure are directed to dynamically enabling or disabling the linkage of the SS sets and the corresponding PDCCH candidate monitoring occasions between mTRPs. In some examples, a UE may receive, from any one TRP in a group of TRPs, a RRC message. The RRC message configuring a linkage between a first PDCCH candidate associated with a first monitoring occasion in a first SS set associated with a first TRP of the group of TRPs and a second PDCCH candidate associated with a second monitoring occasion in a second SS set associated with a second TRP of the group of TRPs. After receiving the RRC message, the UE may receive, from any one of the group of TRPs, a dynamic indication enabling or disabling the linkage. Then, the UE may monitor the first monitoring occasion for first PDCCH candidate. Additionally, the UE may selectively monitor the second monitoring occasion for the second PDCCH candidate based on whether the linkage is enabled or disabled. In some examples, the linkage may be disabled based on an amount of network traffic satisfying a disabling condition. For example, the disabling condition may be satisfied based on the amount of network traffic being less than a traffic threshold. Additionally, the linkage may be enabled based on the amount of network traffic satisfying an enabling condition. For example, the enabling condition may be satisfied based on the amount of network traffic being equal to or greater than the traffic threshold.

Dynamically enabling or disabling the linkage, configured via the RRC message, based on receiving the dynamic indication at the UE from any one TRP of the group of TRPs may be realized one or more of the following potential advantages. In some examples, the described techniques may reduce energy consumption at both the wireless communication network and the UE by dynamically disabling or enabling the linkage of the SS sets and the corresponding PDCCH candidate monitoring occasions between mTRPs. In such examples, disabling the linkage via the dynamic indication reduces energy consumption at the wireless communication network by reducing a number of transmissions from one or more TRPs associated with the wireless communication network. Additionally, disabling the linkage via the dynamic indication reduces energy consumption at the wireless communication network by reducing a number PDCCH candidate monitoring occasions at the UE.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a linkage module 140. For brevity, only one UE 120d is shown as including the linkage module 140. The linkage module 140 may perform one or more steps described with reference to FIG. 8.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
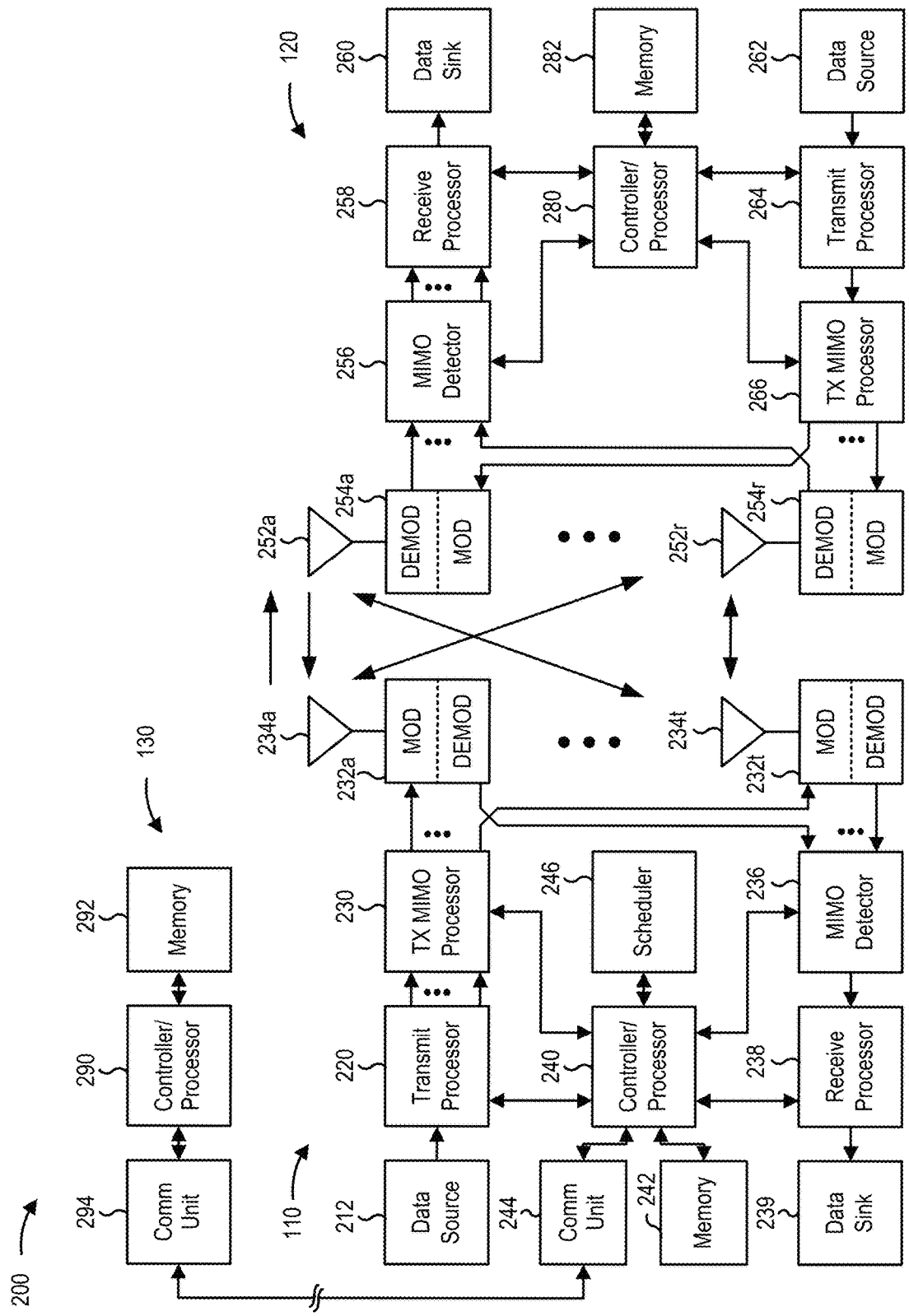
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with dynamically (e.g., adaptively) linking SS sets and corresponding PDCCH candidate monitoring occasions as described in more detail elsewhere. For example, the controller/processor 240 of the base station 110, the controller/processor 280 of the UE 120, and/or any other component(s) of FIG. 2 may perform or direct operations of, for example, the processes of FIG. 8 and/or other processes as described. Memories 242 and 282 may store data and program codes for the base station 110 and UE 120, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
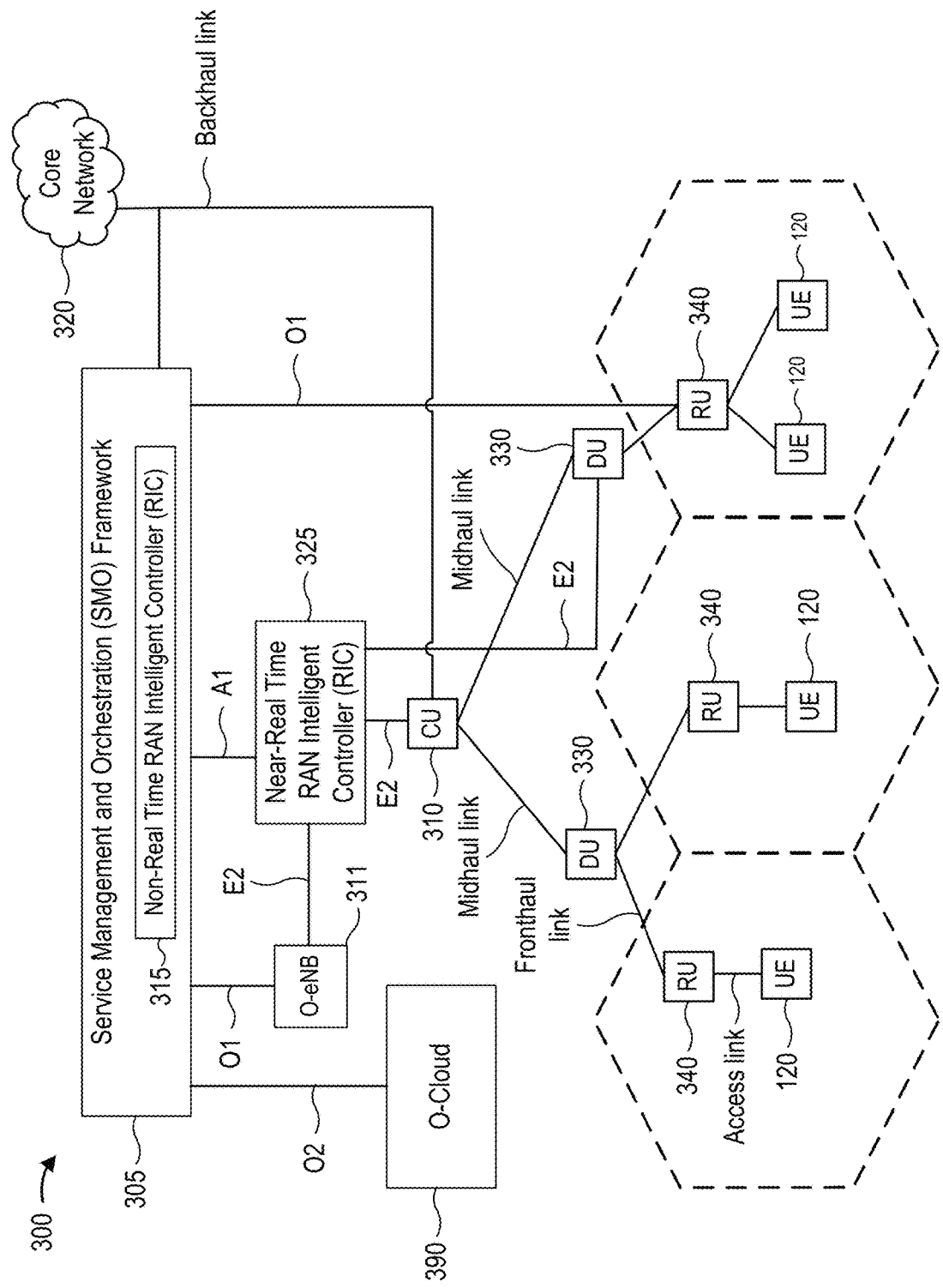
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
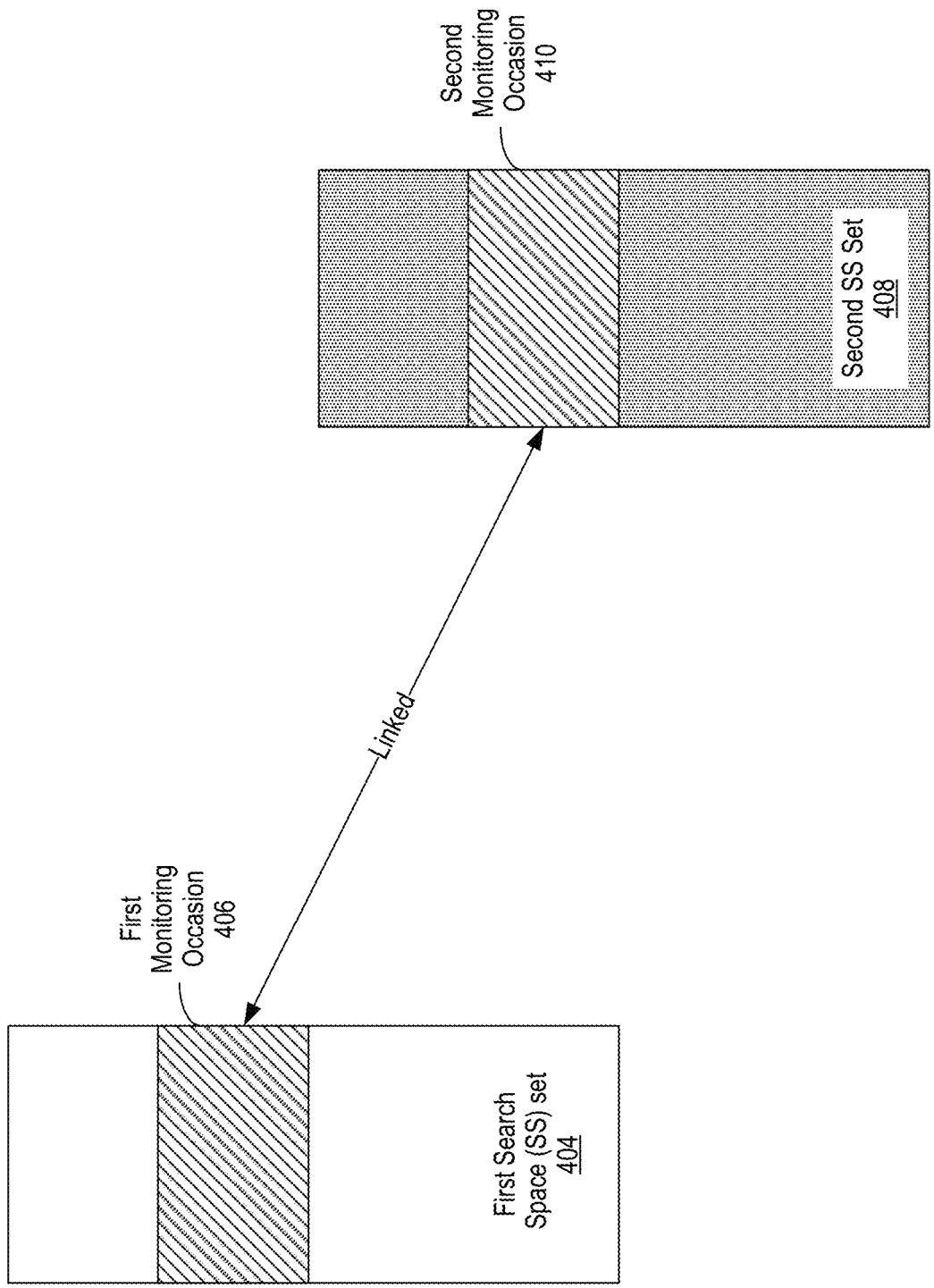
FIG. 4 is a block diagram illustrating an example of linking physical downlink control channel (PDCCH) candidates, in accordance with aspects of the present disclosure.

As discussed, in some mTRP systems, two physical downlink control channel (PDCCH) candidate monitoring occasions may be linked between two search space (SS) sets. FIG. 4 is a block diagram illustrating an example of linking PDCCH candidates, in accordance with aspects of the present disclosure. As shown in the example of FIG. 4, a first SS set 404 may be associated with a first TRP of a group of TRPs and may include a first monitoring occasion 406 associated with a first PDCCH candidate. A second SS set 408 may be associated with a second TRP (indicated via the dot fill in FIG. 4) of the group of TRPs and may include a second monitoring occasion 410 associated with a second PDCCH candidate. The first SS set 404 may be associated with a first control and resource set (CORESET) associated with a first transmission configuration indicator (TCI) state and the second SS set 408 may be associated with a second CORESET associated with a second TCI state.

In some examples, a UE may receive an RRC message indicating that the SS sets 404 and 408 are linked. The SS sets 404 and 408 may be associated with a universal search space (USS) or a Type 3 common search space (CSS). Other types of search spaces, such as other types of CSSs (e.g., Type 0, Type 0A, Type 1, or Type 2) may not be linked. Additionally, some information elements, such as recovery-SearchSpaceId cannot be linked. The linked SS sets 404 and 408 may have a same periodicity, slot offset, and duration. Additionally, the linked SS sets 404 and 408 may have the same SS set type and may monitor the same DCI formats.

In the example of FIG. 4, the first monitoring occasion 406 (e.g., n-th monitoring occasion) may be linked to the second monitoring occasion 410 (e.g., n-th monitoring occasion). The linked SS sets 404 and 408 may have the same number of monitoring occasions within a slot. Furthermore, respective PDCCH candidates associated with one monitoring occasion in each of the linked SS sets 404 and 408 may be linked. For example, as shown in FIG. 4, the first PDCCH candidate associated with a first monitoring occasion 406 in a first SS set 404 may be linked with the second PDCCH candidate associated with a second monitoring occasion 410 in a second SS set 408. In the example of FIG. 4, each PDCCH candidate may correspond to a PDCCH transmitted by a different TRP. The linked PDCCH candidates may have the same aggregation level and the same candidate index. The linked SS sets 404 and 408 may be configured with the same number of PDCCH candidates for each aggregation level. Additionally, the PDCCH candidates may have the same aggregation level, include the same DCI payload, and also have the same coded bits. A UE may be aware of an explicit linkage between the PDCCH candidates before decoding the PDCCH associated with the linked PDCCH candidates. The SS sets 404 and 408 may be limited to a one-to-one mapping between monitoring occasions 406 and 410.

Figure 5:
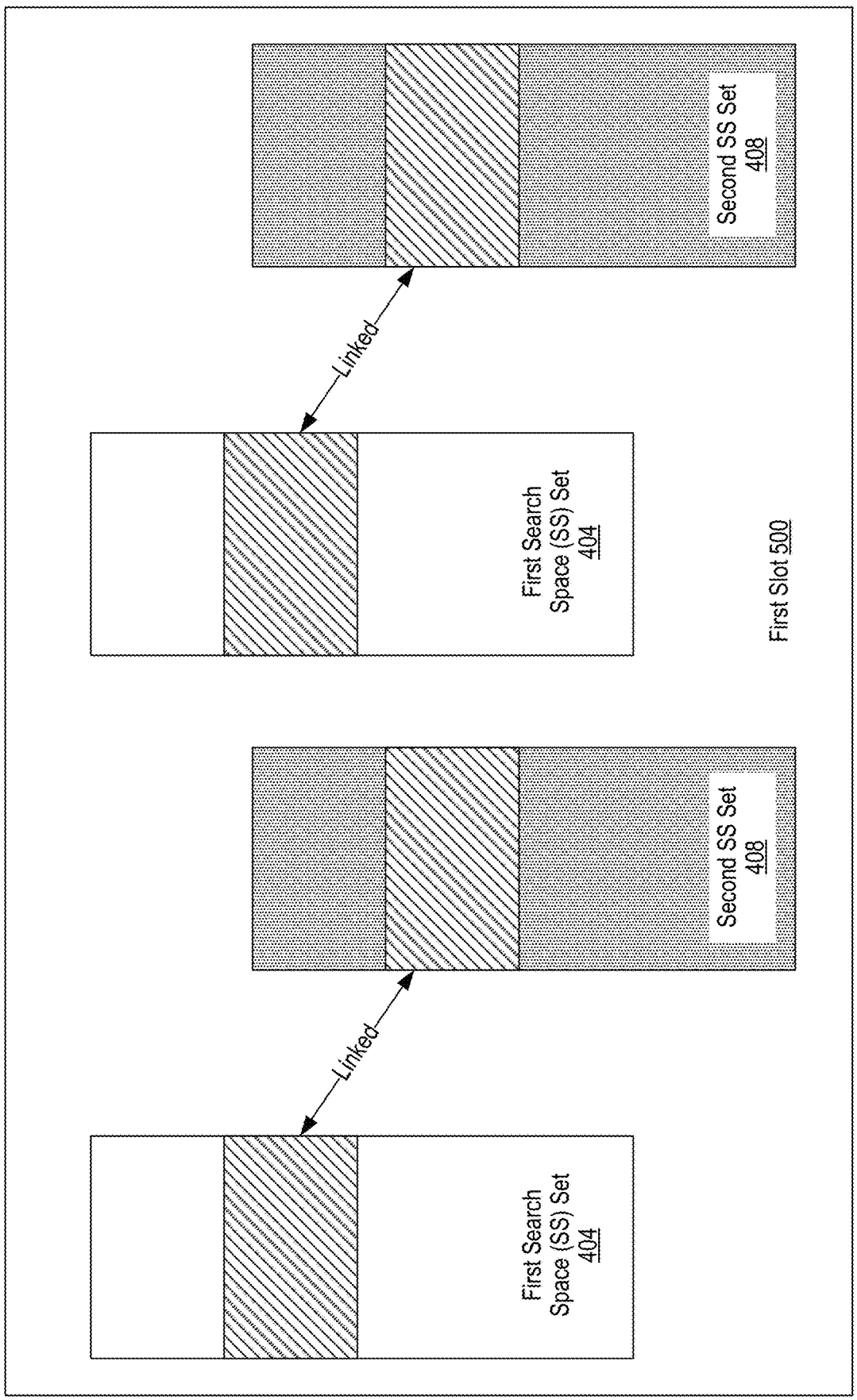
FIG. 5 is a block diagram illustrating an example of repeating linked search space (SS) sets within a slot, in accordance with various aspects of the present disclosure.

In some examples, the linked SS sets 404 and 408 may be repeated within a slot. FIG. 5 is a block diagram illustrating an example of repeating the linked SS sets 404 and 408 within a first slot 500, in accordance with various aspects of the present disclosure. As shown in the example of FIG. 5, a first SS set 404 may be linked with a second SS set 408. Furthermore, the linked SS sets 404 and 408 may be repeated within the first slot 500. For example, the first slot 500 may include two instances of the first SS set 404 and two instances of the second SS set 408.

Figure 6A:
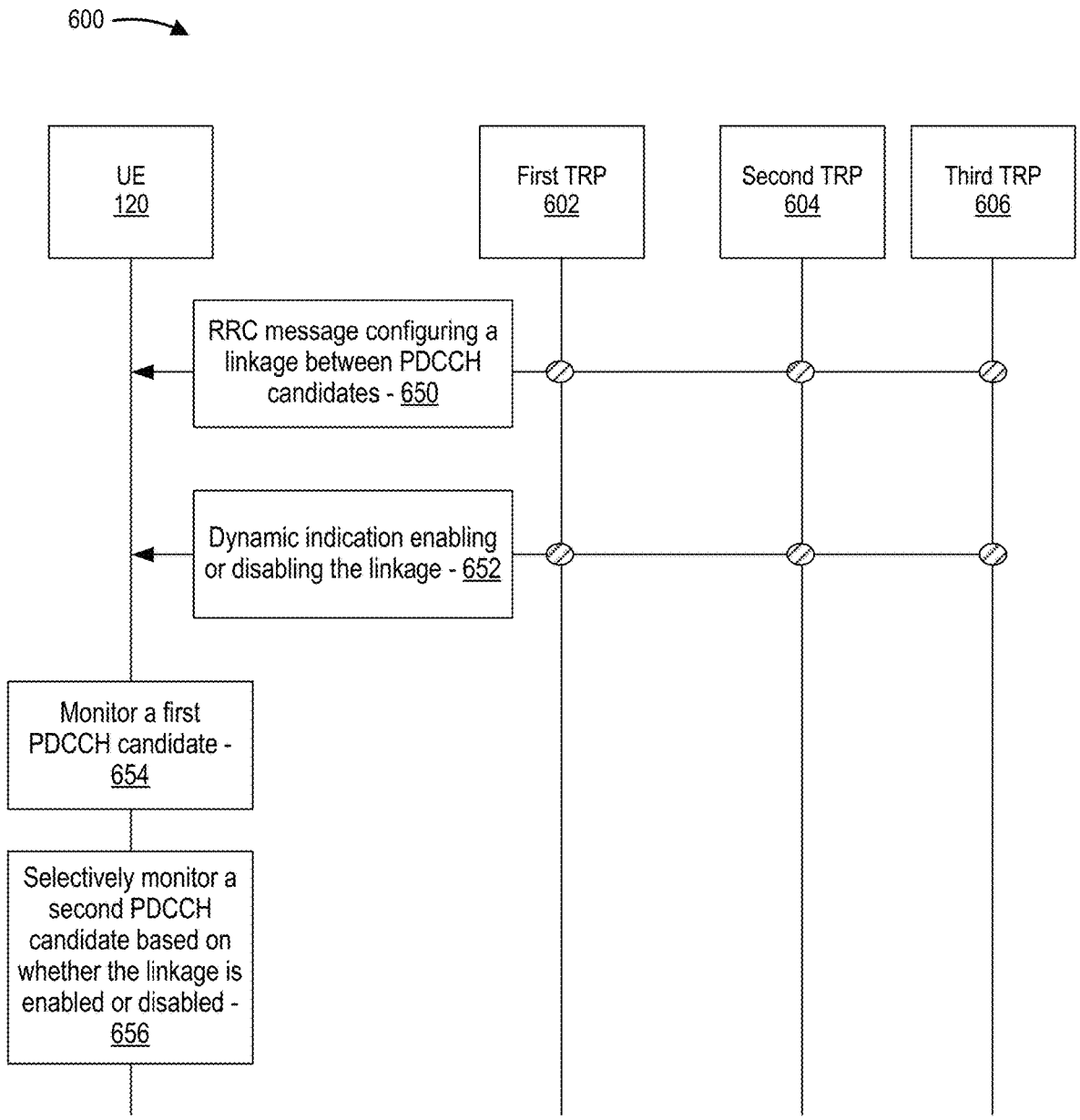
FIG. 6A is a timing diagram illustrating an example of dynamically enabling or disabling PDCCH candidate linkage, in accordance with various aspects of the present disclosure.

As discussed, various aspects of the present disclosure are directed to dynamically enabling or disabling PDCCH candidate linkage. FIG. 6A is a timing diagram illustrating an example 600 of dynamically enabling or disabling PDCCH candidate linkage, in accordance with various aspects of the present disclosure. As shown in the example 600 of FIG. 6A, a UE 120 may communicate with a group of TRPs, such as a first TRP 602, a second TRP 604, and a third TRP 606. For ease of explanation, the group of TRPs is limited to the three TRPs 602, 604, and 606. Still, aspects of the present disclosure are not limited to three TRPs in the group of TRPs. In some examples, the group of TRPs may include more than three TRPs. In some other examples, the group of TRPs may only include the first TRP 602 and the second TRP 604. Each TRP 602, 604, and 606 may be an example of a base station 110 described with reference to FIGS. 1 and 2, or a CU 310, DU 330, or RU 340 described with reference to FIG. 3.

As shown in the example 600 of FIG. 6A, at 650, the UE 120 may receive, from any one TRP 602, 604, and 606 of the group of TRPs, a first RRC message configuring a linkage between a first PDCCH candidate associated with a first monitoring occasion in a first SS set associated with the first TRP 602 and a second PDCCH candidate associated with a second monitoring occasion in a second SS set associated with the second TRP 604. At 652, the UE 120 may receive, from any one TRP 602, 604, and 606 of the group of TRPs, a dynamic indication enabling or disabling the linkage. At 654, the UE 120 may monitor the first PDCCH candidate. Additionally, at 656, the UE 120 may selectively monitor the second PDCCH candidate based on whether the linkage is enabled or disabled.

In some examples, the dynamic indication includes a set of bits for disabling the linkage and re-enabling the linkage. Additionally, the dynamic indication may be either a PDCCH payload or an invalid downlink control information (DCI) message. The invalid DCI message is an example of a DCI message with an invalid bit sequence. In some examples, the set of bits is limited to one bit that disables the linkage or re-enables the linkage. In some such examples, one or more other bits may indicate a new linkage configuration corresponding to a new PDCCH configuration. The one or more bits may be included, in the set of bits, with the one bit that disables the linkage or re-enables the linkage. Alternatively, the one or more bits may be separately indicated by any TRP 602, 604, and 606 of the group of TRPs.

In some examples, the one or more bits may correspond to an index associated with the new linkage configuration. In some examples, prior to 652, the UE 120 may receive, from any one TRP 602, 604, and 606 of the group of TRPs, an RRC message (not shown in the example 600 of FIG. 6A) indicating a set of linkage configurations. TABLE 1 is an example of the set of linkage configurations.

TABLE 1

| Index | Linkage Configuration |
|---|---|
| 00 | Re-enable the linkage |
| 01 | Disable the linkage and configure the UE to only monitor the first monitoring occasion |
| 10 | Re-enable the linkage based on a first TRP configuration of the first TRP |
| 11 | Re-enable the linkage based on a second TRP configuration of the second TRP |

As shown in TABLE 1, each linkage configuration of the set of linkage configurations is associated with an index. The index may correspond to the set of bits indicated in the dynamic indication, such as the invalid DCI. Each linkage configuration may configure a new PDCCH configuration at the UE based on whether the linkage was enabled or disabled. As shown in the example of TABLE 1, a first linkage configuration (e.g., indicated by index 00) may be associated with re-enabling the full linkage (e.g., the initial linkage indicated via the RRC message at 650). Additionally, a second linkage configuration (e.g., indicated by index 01) may be associated with disabling the linkage and configuring the UE to only monitor the first monitoring occasion. In such examples, the UE 120 does not monitor the second monitoring occasions associated with the second TRP 604.

Furthermore, a third linkage configuration (e.g., indicated by index 10) may be associated with re-enabling the linkage based on a first TRP configuration of the first TRP. In such examples, the UE 120 may monitor the first and second monitoring occasions configured via the RRC message. However, the PDCCH associated with the first and second PDCCH candidates may be transmitted from the first TRP 602. Finally, a fourth linkage configuration (e.g., indicated by index 11) may be associated with re-enabling the linkage based on a second TRP configuration of the second TRP. In such examples, the UE 120 may monitor the first and second monitoring occasions configured via the RRC message. However, the PDCCH associated with the first and second PDCCH candidates may be transmitted from the second TRP 602.

The second linkage configuration may be associated with disabling the linkage. Additionally, the first, third, and fourth linkage configurations may be associated with enabling or re-enabling (e.g., restoring) the linkage. As an example, if the linkage is re-enable based on the third linkage configuration, the UE 120 may restore the link between the first monitoring occasion in the first SS set with the second monitoring occasion in the second SS set. Moreover, the UE 120 may monitor the first and second PDCCH candidates for a PDCCH transmitted via the first TRP 602. As another example, if the linkage is re-enabled based on the second linkage configuration, the UE 120 may restore the link between the first monitoring occasion in the first SS set with the second monitoring occasion in the second SS set. In addition, the UE 120 may monitor the first and second PDCCH candidates for a PDCCH transmitted via the second TRP 604.

FIG. 6B is a block diagram illustrating an example 620 of monitoring one or more monitoring occasions based on a new PDCCH configuration, in accordance with various aspects of the present disclosure. In the example 620 of FIG. 6B, a UE, such as the UE 120, may monitor respective monitoring occasions associated with linked SS sets 404 and 408 within a first slot 500, as described with reference to FIG. 5. Additionally, as described with reference to FIG. 5, the linked SS sets 404 and 408 are repeated within the first slot 500. As discussed, the UE may receive from any one TRP of a group of TRPs, such as any TRP 602, 604, and 606 of the group of TRPs described with reference to FIG. 6A, an invalid DCI message (e.g., a dynamic indication) disabling the linked SS sets 404 and 408. In the example 620 of FIG. 6B, the invalid DCI message may indicate an index (e.g., index 01) corresponding to the second linkage configuration described in TABLE 1. The UE may then monitor one or more PDCCH candidates based on the new PDCCH configuration associated with the second linkage configuration. In the example of FIG. 6B, at the second slot 660, the UE may disable the linkage and only monitor the first PDCCH candidate associated with the first monitoring occasions of the first SS sets 404.

Figure 6C:
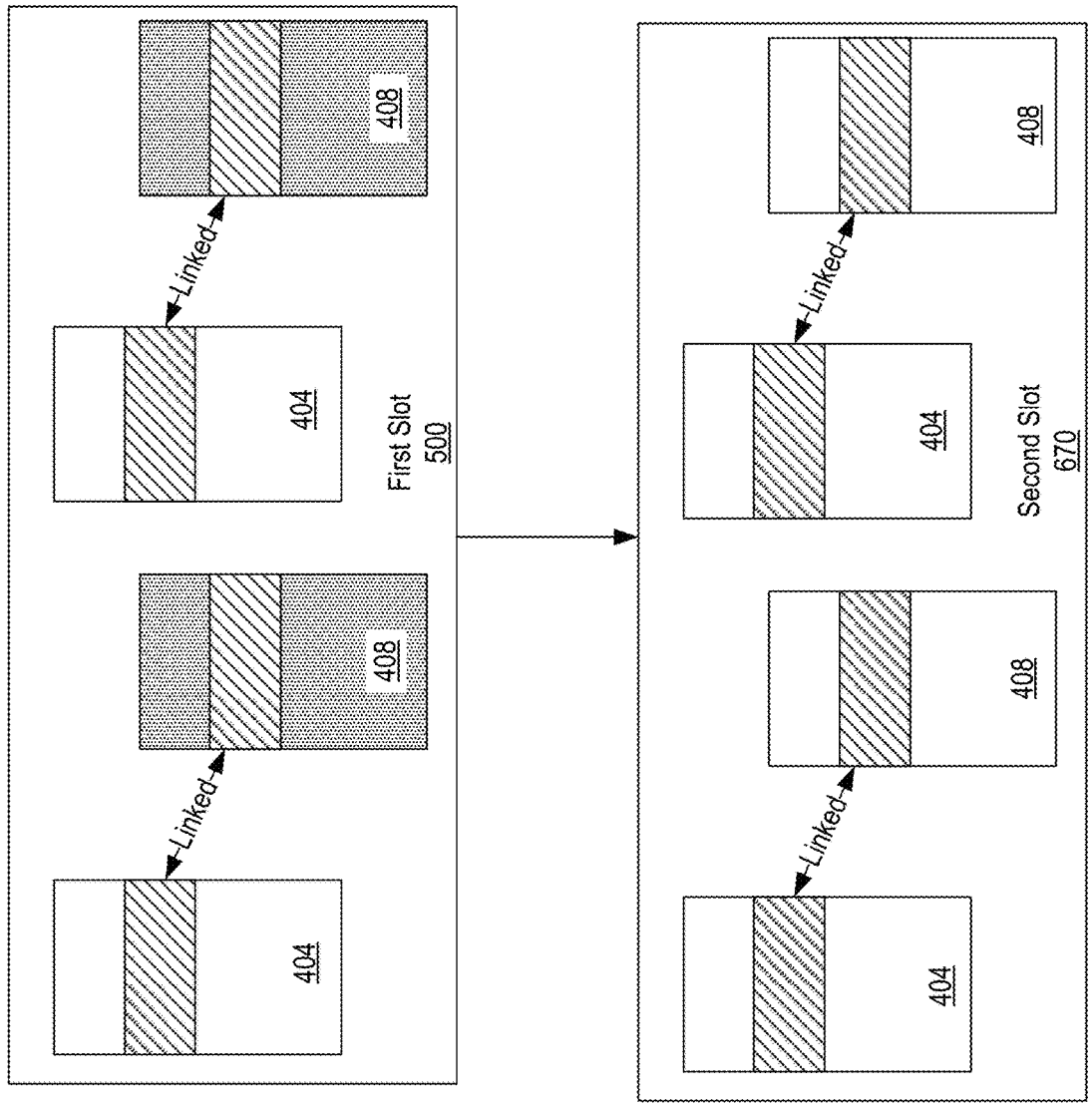

FIG. 6C is a block diagram illustrating an example 630 of monitoring one or more monitoring occasions based on a new PDCCH configuration, in accordance with various aspects of the present disclosure. As shown in the example 630 of FIG. 6C, at a first time period, a UE, such as the UE 120, may monitor respective monitoring occasions associated with the linked SS sets 404 and 408 within a first slot 500, as described with reference to FIG. 5. Additionally, as described with reference to FIG. 5, the linked SS sets 404 and 408 are repeated within the first slot 500. As discussed with reference to FIG. 6A, the UE may receive, from any one TRP 602, 604, and 606 of the group of TRPs, a dynamic indication disabling the linked SS sets 404 and 408. In some examples, the UE may receive, from any one TRP 602, 604, and 606 of the group of TRPs, another dynamic indication, such as an invalid DCI message, re-enabling the linkage. In the example 630 of FIG. 6C, the dynamic indication may indicate an index (e.g., index 10) corresponding to the third linkage configuration described in TABLE 1. The UE may then monitor one or more PDCCH candidates based on the new PDCCH configuration associated with the third linkage configuration. In the example of FIG. 6B, at a second slot 670, the UE may monitor PDCCH candidates within respective monitoring occasions in the linked SS sets 404 and 408 based on receiving the dynamic message that re-enabled the linkage. However, in this example, the PDCCH may only be transmitted from the first TRP, such as the first TRP 602 described with reference to FIG. 6A, based on the linkage being re-enabled by the third linkage configuration.

Referring again to FIG. 6A, in some examples, prior to 652, the UE 120 may receive, from any one TRP 602, 604, and 606 of the group of TRPs, an RRC message (not shown in the example 600 of FIG. 6A) indicating a time period for activating an adjustment to the linkage. In such examples, the time period may be used to disable or re-enable the linkage based on receiving the second message, at 652, and the third message, at 654, respectively. For example, the time period may correspond to a number of slots n. In one example, a number of slots between receiving the dynamic indication, at 652, and disabling the linkage is equal to the number of slots n (e.g., the time period). As another example, a number of slots between receiving the dynamic indication, at 652, and re-enabling the linkage is equal to the number of slots n (e.g., the time period).

Figure 6D:
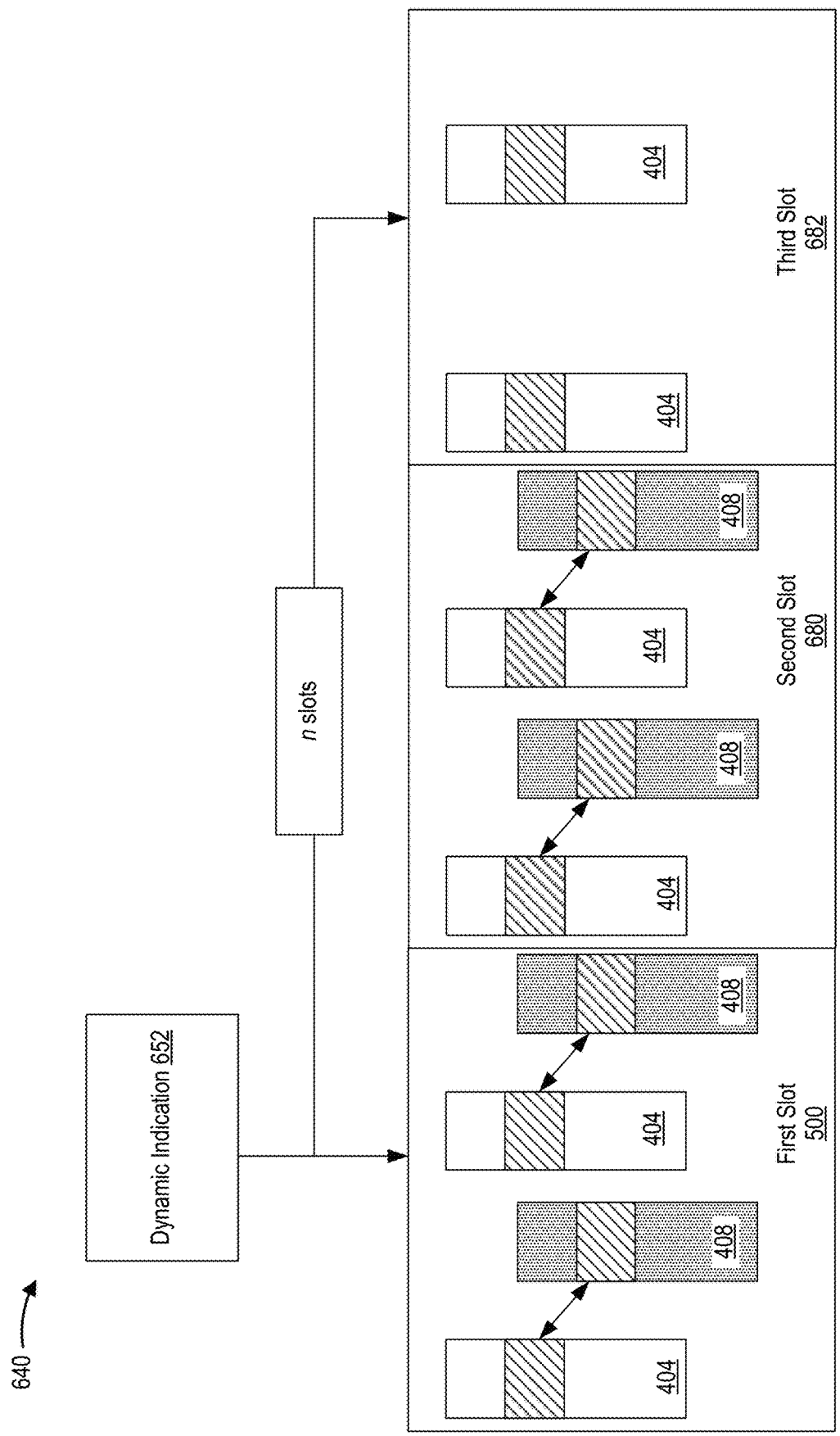
FIG. 6D is a block diagram illustrating an example of adjusting a linkage after a time period, in accordance with various aspects of the present disclosure.

FIG. 6D is a block diagram illustrating an example 640 of adjusting a linkage after a time period, in accordance with various aspects of the present disclosure. In the example 640 of FIG. 6D, a UE, such as the UE 120, may monitor respective monitoring occasions associated with linked SS sets 404 and 408 within a first slot 500 as described with reference to FIG. 5. Additionally, as described with reference to FIG. 5, the linked SS sets 404 and 408 are repeated within the first slot 500. In the example 640 of FIG. 6D, the UE may be configured with the time period (e.g., n slots) for adjusting the linkage. As shown in the example 640 of FIG. 6D, the UE may receive the dynamic indication at 652, as described with reference to FIG. 6A, disabling the linkage. In this example, the UE may disable the linkage at a third slot 682, which is n slots after receiving the dynamic indication. As shown in the example 640 of FIG. 6D, the linkage may remain active, as configured via the RRC message, during the n slots (e.g., the time period). The n slots may be inclusive of the slot receiving the dynamic indication. In the example 640 of FIG. 6D, n is equal to two, such that the two slots include the first slot 500 and a second slot 680.

In some examples during the time period, the UE may receive from any one TRP of the group of TRPs, a first message indicating a broken linkage, such as the linkage in the second slot 680. In some such examples, the UE may expect to receive, from any one TRP of the group of TRPs, a second message indicating the broken linkage should be activated for another n slots after receiving the second message. In such examples, the linkage may then be disabled n slots after receiving the second message. In other such examples, the UE may not expect to receive the second message activating the broken linkage.

Figure 7:
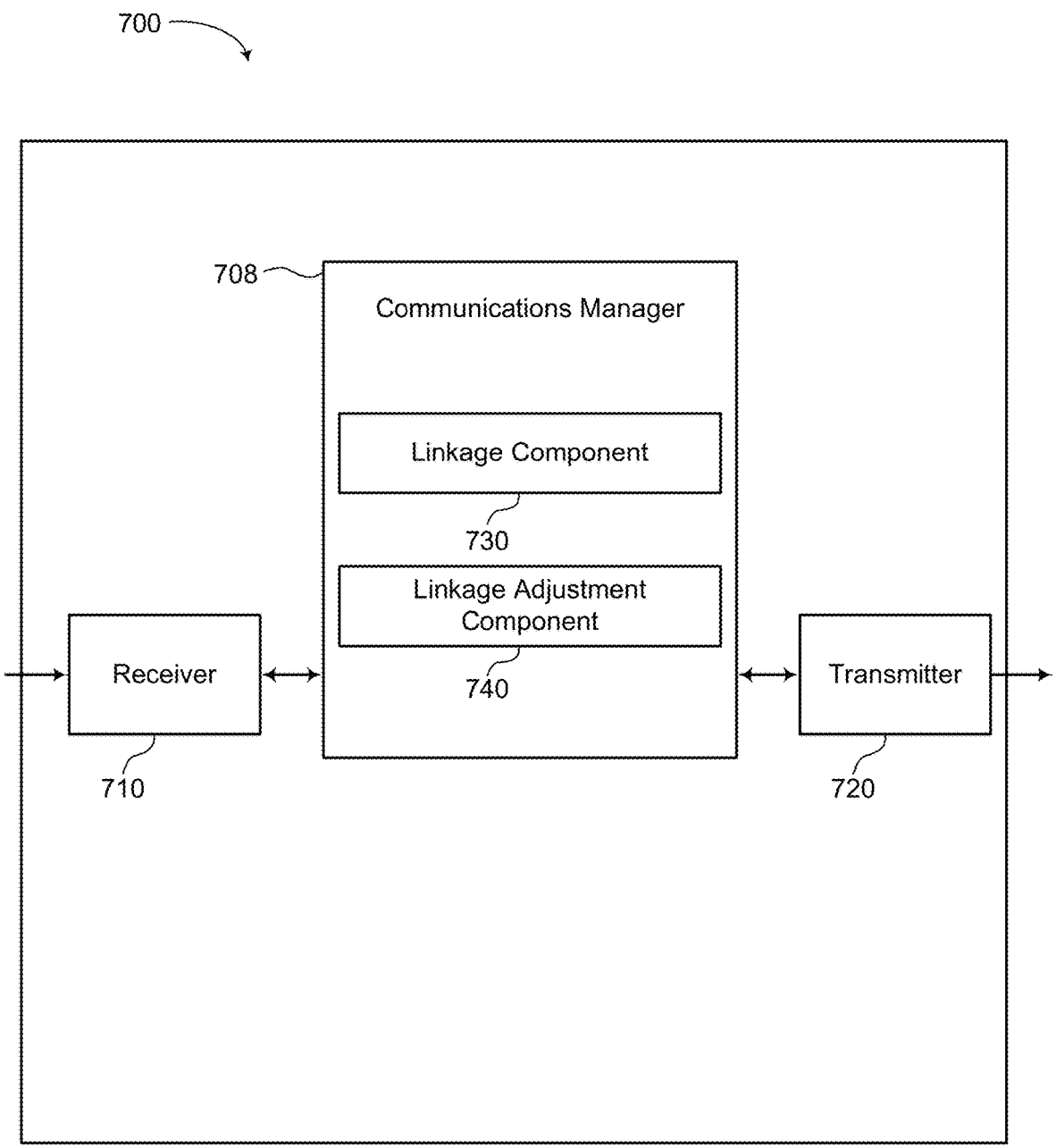
FIG. 7 is a block diagram illustrating an example wireless communication device that supports dynamically enabling or disabling PDCCH candidate linkage, in accordance with various aspects of the present disclosure.

FIG. 7 is a block diagram illustrating an example wireless communication device 700 that supports dynamically enabling or disabling PDCCH candidate linkage. The device 700 may be an example of aspects of a UE 120 described with reference to FIGS. 1-3 and 6A. The wireless communication device 700 may include a receiver 710, a communications manager 708, a transmitter 720, a linkage component 730, and a linkage adjustment component 740, which may be in communication with one another (for example, via one or more buses). In some examples, the wireless communication device 700 is configured to perform operations, including operations of the process 800 described below with reference to FIG. 8.

In some examples, the wireless communication device 700 can include a chip, chipset, package, or device that includes at least one processor and at least one modem (for example, a 5G modem or other cellular modem). In some examples, the communications manager 708, or its subcomponents, may be separate and distinct components. In some examples, at least some components of the communications manager 708 are implemented at least in part as software stored in a memory. For example, portions of one or more of the components of the communications manager 708 can be implemented as non-transitory code executable by the processor to perform the functions or operations of the respective component.

The receiver 710 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical sidelink control channel PSCCH) and data channels (for example, a physical downlink shared channel (PDSCH), physical sidelink shared channel (PSSCH), a physical uplink shared channel (PUSCH)). The other wireless communication devices may include, but are not limited to, a TRP, such as a first TRP 602, a second TRP 604, or a third TRP 606, described with reference to FIG. 6A.

The received information may be passed on to other components of the device 700. The receiver 710 may be an example of aspects of the receive processor 256 described with reference to FIG. 2. The receiver 710 may include a set of radio frequency (RF) chains that are coupled with or otherwise utilize a set of antennas (for example, the set of antennas may be an example of aspects of the antennas 252 described with reference to FIG. 2).

The transmitter 720 may transmit signals generated by the communications manager 708 or other components of the wireless communication device 700. In some examples, the transmitter 720 may be collocated with the receiver 710 in a transceiver. The transmitter 720 may be an example of aspects of the transmit processor 267 described with reference to FIG. 2. The transmitter 720 may be coupled with or otherwise utilize a set of antennas (for example, the set of antennas may be an example of aspects of the antennas 252 described with reference to FIG. 2), which may be antenna elements shared with the receiver 710. In some examples, the transmitter 720 is configured to transmit control information in a PUCCH, PSCCH, or PDCCH and data in a physical uplink shared channel (PUSCH), PSSCH, or PDSCH.

The communications manager 708 may be an example of aspects of the controller/processor 259 described with reference to FIG. 2. The communications manager 708 may include the linkage component 730 and the linkage adjustment component 740. In some examples, working with the receiver 710, the linkage component 730 may receive, from any one TRP of a group of TRPs, an RRC message configuring a linkage between a first PDCCH candidate associated with a first monitoring occasion in a first SS set associated with a first TRP of the group of TRPs and a second PDCCH candidate associated with a second monitoring occasion in a second SS set associated with a second TRP of the group of TRPs. Working in conjunction with the receiver 710, the linkage adjustment component 730 may receive, from any one TRP of the group of TRPs, a dynamic indication enabling or disabling the linkage. Working in conjunction with the receiver 710 and the linkage adjustment component 730, the communications manager 708 may monitor the first monitoring occasion for first PDCCH candidate. Furthermore, working in conjunction with the receiver 710 and the linkage adjustment component 730, the communications manager 708 may selectively monitoring the second monitoring occasion for the second PDCCH candidate based at least in part on whether the linkage is enabled or disabled.

Figure 8:
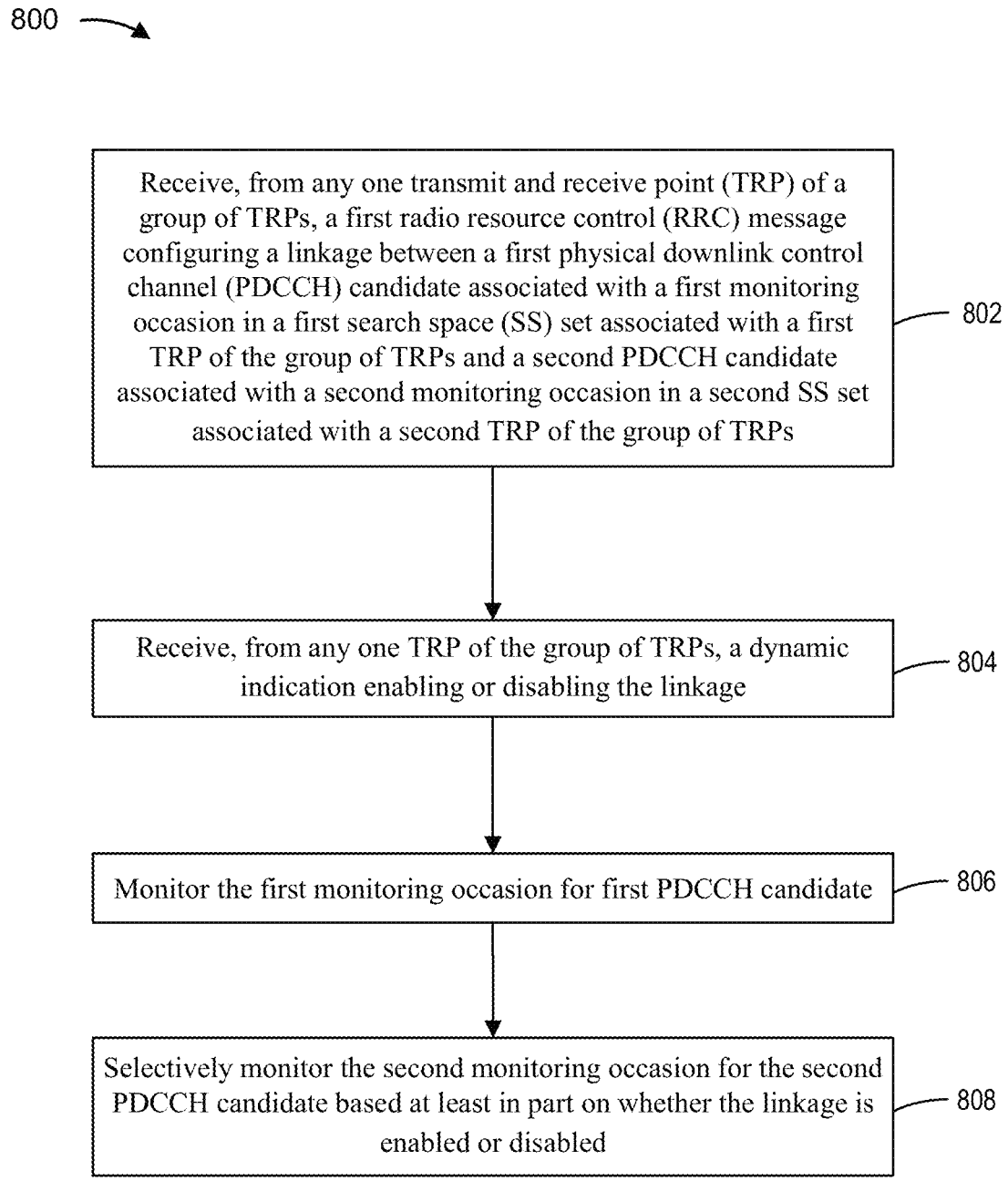
FIG. 8 is a flow diagram illustrating an example process performed by a UE, in accordance with various aspects of the present disclosure.

FIG. 8 is a flow diagram illustrating an example process 800 performed by a UE, in accordance with some aspects of the present disclosure. The UE may be an example of a UE 120 described with reference to FIGS. 1-3 and 6A. The example process 800 is an example of dynamically enabling or disabling PDCCH candidate linkage. As shown in FIG. 8, the process 800 begins at block 802 by receiving, from any one TRP of a group of TRPs, an RRC message configuring a linkage between a first PDCCH candidate associated with a first monitoring occasion in a first SS set associated with a first TRP of the group of TRPs and a second PDCCH candidate associated with a second monitoring occasion in a second SS set associated with a second TRP of the group of TRPs. At block 804, the process 800 may receive, from any one TRP of the group of TRPs, a dynamic indication enabling or disabling the linkage. At block 806, the process 800 may monitor the first monitoring occasion for first PDCCH candidate. Furthermore, at block 808, the process 800 may selectively monitor the second monitoring occasion for the second PDCCH candidate based on whether the linkage is enabled or disabled.

Implementation examples are described in the following numbered clauses:

Clause 1. A method for wireless communication at a UE, comprising: receiving, from any one TRP of a group of TRPs, a first RRC message configuring a linkage between a first PDCCH candidate associated with a first monitoring occasion in a first SS set associated with a first TRP of the group of TRPs and a second PDCCH candidate associated with a second monitoring occasion in a second SS set associated with a second TRP of the group of TRPs; receiving, from any one TRP of the group of TRPs, a dynamic indication enabling or disabling the linkage; monitoring the first monitoring occasion for first PDCCH candidate; and selectively monitoring the second monitoring occasion for the second PDCCH candidate based at least in part on whether the linkage is enabled or disabled.

Clause 2. The method of Clause 1, wherein the dynamic indication includes a set of bits for disabling the linkage and re-enabling the linkage.

Clause 3. The method of any one of Clauses 1-2, wherein the dynamic indication is a PDCCH payload or an invalid DCI message.

Clause 4. The method of any one of Clauses 1-3, further comprising receiving, from any one TRP of the group of TRPs, a second RRC message indicating a set of linkage configurations, wherein each linkage configuration of the set of linkage configurations is associated with an index.

Clause 5. The method of Clause 4, wherein the set of linkage configurations comprise: a first linkage configuration associated with re-enabling the linkage; a second linkage configuration associated with disabling the linkage and configuring the UE to only monitor the first monitoring occasion; a third linkage configuration associated with re-enabling the linkage based on a first TRP configuration of the first TRP; and a fourth linkage configuration associated with re-enabling the linkage based on a second TRP configuration of the second TRP.

Clause 6. The method of Clause 4, further comprising selecting the linkage configuration of the set of linkage configurations associated with the index that corresponds to the set of bits, wherein the UE monitors the first monitoring occasion and selectively monitors the second monitoring occasion based on the selected linkage configuration.

Clause 7. The method of Clause 6, wherein: the selected linkage configuration is the third linkage configuration; and the UE monitors both the first monitoring occasion for the first PDCCH candidate from the first TRP and the second monitoring occasion for the second PDCCH candidate from the first TRP based on the linkage being associated with the first TRP configuration.

Clause 8. The method of Clause 6, wherein: the selected linkage configuration is the third linkage configuration; and the UE monitors both the first monitoring occasion for the first PDCCH candidate from the second TRP and the second monitoring occasion for the second PDCCH candidate from the second TRP based on the linkage being associated with the second TRP configuration.

Clause 9. The method of any one of Clauses 2-4, wherein one bit, of the set of bits, disables the linkage or re-enables the linkage.

Clause 10. The method of Clause 9, wherein one or more bits correspond to the index.

Clause 11. The method of Clause 10, wherein the one or more bits are included in the set of bits.

Clause 12. The method of Clause 10, wherein the one or more bits and the set of bits are separately indicated.

Clause 13. The method of any one of Clauses 1-12, further comprising receiving, from any one TRP of the group of TRPs, a second RRC message indicating a time period for enabling or disabling the linkage, wherein a number of slots between receiving the dynamic indication and disabling or enabling the linkage is equal to the time period.

Clause 14. The method of Clause 13, further comprising: receiving, from any one TRP of the group of TRPs within the time period after receiving the dynamic indication, a first message indicating the linkage is broken; and receiving, from any one TRP of the group of TRPs within the time period after receiving the first message, a second message activating the broken linkage for the time period.

Clause 15. A UE comprising a processor, memory coupled with the processor, and instructions stored in the memory and operable, when executed by the processor to cause the UE to perform any one of Clauses 1 through 14.

Clause 16. An apparatus configured for wireless communications comprising at least one means for performing any one of Clauses 1 through 14.

Clause 17. A computer program comprising code for causing an apparatus to perform any one of Clauses 1 through 14.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such.

Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communications at a user equipment (UE), comprising:
a processor; and
a memory coupled with the processor and storing instructions operable, when executed by the processor, to cause the apparatus to:
receive, from any one transmit and receive point (TRP) of a group of TRPs, a first radio resource control (RRC) message configuring a linkage between a first physical downlink control channel (PDCCH) candidate associated with a first monitoring occasion in a first search space (SS) set associated with a first TRP of the group of TRPs and a second PDCCH candidate associated with a second monitoring occasion in a second SS set associated with a second TRP of the group of TRPs;
receive, from any one TRP of the group of TRPs, a dynamic indication enabling or disabling the linkage;
monitor the first monitoring occasion for first PDCCH candidate; and
selectively monitor the second monitoring occasion for the second PDCCH candidate based at least in part on whether the linkage is enabled or disabled.

2. The apparatus of claim 1, wherein the dynamic indication includes a set of bits for disabling the linkage and re-enabling the linkage.

3. The apparatus of claim 2, wherein the dynamic indication is a PDCCH payload or an invalid downlink control information (DCI) message.

4. The apparatus of claim 3, wherein:
execution of the instructions further cause the apparatus to:
receive, from any one TRP of the group of TRPs, a second RRC message indicating a set of linkage configurations; and
each linkage configuration of the set of linkage configurations is associated with an index.

5. The apparatus of claim 4, wherein the set of linkage configurations comprise:
a first linkage configuration associated with re-enabling the linkage;
a second linkage configuration associated with disabling the linkage and configuring the UE to only monitor the first monitoring occasion;
a third linkage configuration associated with re-enabling the linkage based on a first TRP configuration of the first TRP; and
a fourth linkage configuration associated with re-enabling the linkage based on a second TRP configuration of the second TRP.

6. The apparatus of claim 5, wherein:
execution of the instructions further cause the apparatus to:
select the linkage configuration of the set of linkage configurations associated with the index that corresponds to the set of bits; and
the UE monitors the first monitoring occasion and selectively monitors the second monitoring occasion based on the selected linkage configuration.

7. The method apparatus of claim 6, wherein:
the selected linkage configuration is the third linkage configuration; and
the UE monitors both the first monitoring occasion for the first PDCCH candidate from the first TRP and the second monitoring occasion for the second PDCCH candidate from the first TRP based on the linkage being associated with the first TRP configuration.

8. The apparatus of claim 6, wherein:
the selected linkage configuration is the third linkage configuration; and
the UE monitors both the first monitoring occasion for the first PDCCH candidate from the second TRP and the second monitoring occasion for the second PDCCH candidate from the second TRP based on the linkage being associated with the second TRP configuration.

9. The apparatus of claim 4, wherein one bit, of the set of bits, disables the linkage or re-enables the linkage.

10. The apparatus of claim 9, wherein one or more bits correspond to the index.

11. The apparatus of claim 10, wherein the one or more bits are included in the set of bits.

12. The apparatus of claim 10, wherein the one or more bits and the set of bits are separately indicated.

13. The apparatus of claim 1, wherein:
execution of the instructions further cause the apparatus to:
receive, from any one TRP of the group of TRPs, a second RRC message indicating a time period for enabling or disabling the linkage; and
a number of slots between receiving the dynamic indication and disabling or enabling the linkage is equal to the time period.

14. The apparatus of claim 13, wherein execution of the instructions further cause the apparatus to:
receive, from any one TRP of the group of TRPs within the time period after receiving the dynamic indication, a first message indicating the linkage is broken; and
receive, from any one TRP of the group of TRPs within the time period after receiving the first message, a second message activating the broken linkage for the time period.

15. A method for wireless communication at a user equipment (UE), comprising:
receiving, from any one transmit and receive point (TRP) of a group of TRPs, a first radio resource control (RRC) message configuring a linkage between a first physical downlink control channel (PDCCH) candidate associated with a first monitoring occasion in a first search space (SS) set associated with a first TRP of the group of TRPs and a second PDCCH candidate associated with a second monitoring occasion in a second SS set associated with a second TRP of the group of TRPs;
receiving, from any one TRP of the group of TRPs, a dynamic indication enabling or disabling the linkage;
monitoring the first monitoring occasion for first PDCCH candidate; and
selectively monitoring the second monitoring occasion for the second PDCCH candidate based at least in part on whether the linkage is enabled or disabled.

16. The method of claim 15, wherein the dynamic indication includes a set of bits for disabling the linkage and re-enabling the linkage.

17. The method of claim 16, wherein the dynamic indication is a PDCCH payload or an invalid downlink control information (DCI) message.

18. The method of claim 17, further comprising receiving, from any one TRP of the group of TRPs, a second RRC message indicating a set of linkage configurations,
wherein each linkage configuration of the set of linkage configurations is associated with an index.

19. The method of claim 18, wherein the set of linkage configurations comprise:
a first linkage configuration associated with re-enabling the linkage;
a second linkage configuration associated with disabling the linkage and configuring the UE to only monitor the first monitoring occasion;
a third linkage configuration associated with re-enabling the linkage based on a first TRP configuration of the first TRP; and
a fourth linkage configuration associated with re-enabling the linkage based on a second TRP configuration of the second TRP.

20. The method of claim 19, further comprising selecting the linkage configuration of the set of linkage configurations associated with the index that corresponds to the set of bits,
wherein the UE monitors the first monitoring occasion and selectively monitors the second monitoring occasion based on the selected linkage configuration.

21. The method of claim 20, wherein:
the selected linkage configuration is the third linkage configuration; and
the UE monitors both the first monitoring occasion for the first PDCCH candidate from the first TRP and the second monitoring occasion for the second PDCCH candidate from the first TRP based on the linkage being associated with the first TRP configuration.

22. The method of claim 20, wherein:
the selected linkage configuration is the third linkage configuration; and
the UE monitors both the first monitoring occasion for the first PDCCH candidate from the second TRP and the second monitoring occasion for the second PDCCH candidate from the second TRP based on the linkage being associated with the second TRP configuration.

23. The method of claim 18, wherein one bit, of the set of bits, disables the linkage or re-enables the linkage.

24. The method of claim 23, wherein one or more bits correspond to the index.

25. The method of claim 24, wherein the one or more bits are included in the set of bits.

26. The method of claim 24, wherein the one or more bits and the set of bits are separately indicated.

27. The method of claim 15, further comprising receiving, from any one TRP of the group of TRPs, a second RRC message indicating a time period for enabling or disabling the linkage,
wherein a number of slots between receiving the dynamic indication and disabling or enabling the linkage is equal to the time period.

28. The method of claim 27, further comprising:
receiving, from any one TRP of the group of TRPs within the time period after receiving the dynamic indication, a first message indicating the linkage is broken; and
receiving, from any one TRP of the group of TRPs within the time period after receiving the first message, a second message activating the broken linkage for the time period.

29. An apparatus for wireless communication at a user equipment (UE), comprising:
means for receiving, from any one transmit and receive point (TRP) of a group of TRPs, a first radio resource control (RRC) message configuring a linkage between a first physical downlink control channel (PDCCH) candidate associated with a first monitoring occasion in a first search space (SS) set associated with a first TRP of the group of TRPs and a second PDCCH candidate associated with a second monitoring occasion in a second SS set associated with a second TRP of the group of TRPs;
means for receiving, from any one TRP of the group of TRPs, a dynamic indication enabling or disabling the linkage;
means for monitoring the first monitoring occasion for first PDCCH candidate; and
means for selectively monitoring the second monitoring occasion for the second PDCCH candidate based at least in part on whether the linkage is enabled or disabled.

30. A non-transitory computer-readable medium having program code recorded thereon for wireless communication, the program code executed by a processor and comprising:
program code to receive, from any one transmit and receive point (TRP) of a group of TRPs, a first radio resource control (RRC) message configuring a linkage between a first physical downlink control channel (PDCCH) candidate associated with a first monitoring occasion in a first search space (SS) set associated with a first TRP of the group of TRPs and a second PDCCH candidate associated with a second monitoring occasion in a second SS set associated with a second TRP of the group of TRPs;
program code to receive, from any one TRP of the group of TRPs, a dynamic indication enabling or disabling the linkage;
program code to monitor the first monitoring occasion for first PDCCH candidate; and
program code to selectively monitor the second monitoring occasion for the second PDCCH candidate based at least in part on whether the linkage is enabled or disabled.

* * * * *